(12) United States Patent
Foxhoven et al.

(10) Patent No.: US 9,882,767 B1
(45) Date of Patent: Jan. 30, 2018

(54) DISTRIBUTED CLOUD-BASED DYNAMIC NAME SERVER SURROGATION SYSTEMS AND METHODS

(71) Applicants: Patrick Foxhoven, San Jose, CA (US); John Chanak, Saratoga, CA (US); Bill Fehring, San Francisco, CA (US)

(72) Inventors: Patrick Foxhoven, San Jose, CA (US); John Chanak, Saratoga, CA (US); Bill Fehring, San Francisco, CA (US)

(73) Assignee: Zscaler, Inc., San Jose, CA (US)

( * ) Notice: Subject to any disclaimer, the term of this patent is extended or adjusted under 35 U.S.C. 154(b) by 241 days.

(21) Appl. No.: 13/948,362

(22) Filed: Jul. 23, 2013

(51) Int. Cl.
  *G06F 15/173* (2006.01)
  *H04L 29/08* (2006.01)

(52) U.S. Cl.
  CPC .............................. *H04L 29/08288* (2013.01)

(58) Field of Classification Search
  CPC . H04L 61/25; H04L 45/745; H04L 29/08288; H04L 47/125; H04L 61/2507
  See application file for complete search history.

(56) References Cited

U.S. PATENT DOCUMENTS

| | | | |
|---|---|---|---|
| 7,032,010 B1* | 4/2006 | Swildens | H04L 29/06 709/219 |
| 7,899,849 B2 | 3/2011 | Chaudhry et al. | |
| 8,185,510 B2 | 5/2012 | Chaudhry et al. | |
| 8,275,867 B2 | 9/2012 | Neerdaels | |
| 8,275,873 B2 | 9/2012 | Josefsberg et al. | |
| 8,423,672 B2* | 4/2013 | Liu | H04L 29/12066 709/245 |
| 8,429,221 B2 | 4/2013 | Barbir et al. | |
| 8,464,335 B1 | 6/2013 | Sinha et al. | |
| 8,676,989 B2* | 3/2014 | Treuhaft et al. | 709/227 |
| 8,707,429 B2* | 4/2014 | Wilbourn et al. | 726/22 |
| 8,924,508 B1* | 12/2014 | Medved et al. | 709/217 |
| 2007/0294419 A1* | 12/2007 | Ulevitch | H04L 29/12066 709/230 |

(Continued)

FOREIGN PATENT DOCUMENTS

WO  WO/2012/058238 A2  5/2012
WO  WO 2012058238 A2 *  5/2012

*Primary Examiner* — Umar Cheema
*Assistant Examiner* — Tesfu Mekonen
(74) *Attorney, Agent, or Firm* — Clements Bernard Walker PLLC; Lawrence A. Baratta, Jr.

(57) ABSTRACT

A Dynamic Name Server (DNS) surrogation method, a DNS system, and a DNS server provide DNS surrogation which is the idea that if a user device sends a DNS resolution request to a given DNS server that server does not need to actually perform the recursion itself. A policy can be defined telling the server that first received the request to take other factors into account and "relay" or "surrogate" that request to another node. This additional node is called a "surrogate" and it actually performs the recursion therefore allowing the resolving party to perform proper localization, optimization, or any other form of differentiated resolution. This surrogation also distributes the job of actually performing resolution, which adds scalability to the DNS server or service itself. A network of "surrogate" resolvers is possible as well as the concept of every client needing DNS resolution can also become a surrogate.

17 Claims, 7 Drawing Sheets

(56) References Cited

U.S. PATENT DOCUMENTS

2012/0173760 A1\* 7/2012 Jog .................... H04L 61/1511
                                                                709/245
2013/0024503 A1   1/2013 Neerdaels
2013/0204978 A1\* 8/2013 Fleischman ......... H04L 61/1511
                                                                709/219

\* cited by examiner

DISTRIBUTED CLOUD-BASED DYNAMIC NAME SERVER SURROGATION SYSTEMS AND METHODS

FIELD OF THE DISCLOSURE

The present disclosure relates generally to computer networking systems and methods. More particularly, the present disclosure relates to distributed cloud-based Dynamic Name Server (DNS) surrogation systems and methods.

BACKGROUND OF THE DISCLOSURE

Each host connected to the Internet has a unique Internet Protocol (IP) address in textual form, translating it to an IP address (e.g., 205.186.173.184) is a process known as DNS resolution or DNS lookup. During DNS resolution, a program that wishes to perform this translation contacts a DNS server that returns the translated IP address. In practice, the entire translation may not occur at a single DNS server; rather, a DNS server contacted initially may recursively call upon other DNS servers to complete the translation. For a more complex Uniform Resource Locator (URL) such as www.site.com/home/products, the crawler component responsible for DNS resolution extracts the host name—in this case www.site.com—and looks up the IP address for the host www.site.com. DNS resolution today takes place in a very static model. A client requests resolution for a given domain name via its configured DNS server, the server recursively searches for that resolution, and then returns the result to the client.

A challenge occurs in that many Internet services today rely on DNS (and the server recursion process) to provide localization of content as well as to optimize content delivery. For example for google.com, the recursion process may return a different IP address for a user located in the U.S. or even for a specific location in the U.S. versus a user in a foreign country. Content is geo-localized or routed to the best destination based on the source IP address of the DNS server that performed the recursion. This is primarily because to localize or optimize content based on DNS alone the only information present beyond the domain name being resolved recursively is the IP address that requested the resolution. As a result to provide the best experience possible (localized or optimized content delivery) DNS servers traditionally needed to be local to the clients that they are serving. Another challenge is how to effectively scale a DNS-policy driven infrastructure that is capable of supporting tens or hundreds of millions of devices. On one hand, it is desired take all DNS traffic from a given device, all the time, to apply policy. On the other the hand, this must manage the load placed that infrastructure when it is adopted at any amount of scale. Having the ability to distribute the load becomes critical.

Finally organizations also provide split horizon/differentiated DNS resolution based on where the client is. For example, the resolution of a particular domain name internal to a network may provide a different IP address than if it originated outside that network. Differentiated resolution can also occur in any application that needs to route traffic based factors other than locality or optimization. As a result, when building a service that is inherently based on DNS, that service either needs to be highly localized and massively distributed or have a way to take into account the need for localized recursion for requested destinations in the form of a policy. Additionally for the DNS service to remain operable it needs to scale elastically and without limit.

BRIEF SUMMARY OF THE DISCLOSURE

In an exemplary embodiment, a Dynamic Name Server (DNS) surrogation method includes receiving a DNS request at a DNS server; performing a policy look up based on a plurality of factors related to the DNS request; surrogating the DNS request to one of a plurality of surrogates based on the policy look up; performing DNS resolution of the DNS request by the one of the plurality of surrogates; and providing a result of the DNS resolution in response to the DNS request. The DNS surrogation method can further include configuring a user device to use the DNS server for DNS resolution; and performing the DNS resolution for the user device by the one of the plurality of surrogates. The DNS surrogation method can further include determining surrogation is required for the DNS request based on the policy look up. The DNS surrogation method can further include performing the policy look up to determine a location of a user device associated with the DNS request, configuration policy, status of the plurality of surrogates, and locality of the plurality of surrogates. The DNS surrogation method can further include providing a request from the one of the plurality of surrogates to an authoritative DNS server associated with a domain name of the DNS request. The DNS surrogation method can further include receiving the result of the DNS resolution based on a location or source Internet Protocol address of the one of the plurality of surrogates instead of based on the DNS server. The one of the plurality of surrogates can include a user device associated with the DNS request. The plurality of surrogates can be geographically diverse and communicatively coupled to the DNS server thereby forming a distributed security cloud network.

In another exemplary embodiment, a Dynamic Name Server (DNS) system includes a Dynamic Name Server (DNS) communicatively coupled to a user device; a policy data store communicatively coupled to the DNS; and a surrogate DNS communicatively coupled to the DNS; wherein the DNS is configured to: receive a DNS request from the user device; perform a policy look up based on a plurality of factors related to the DNS request; and transmit the DNS request to the surrogate DNS based on the policy look up; and wherein the surrogate DNS is configured to: perform DNS resolution of the DNS request; and provide a result of the DNS resolution to the user device. The user device can be configured to use the DNS for DNS resolution, and wherein the DNS resolution is performed by the DNS surrogate. The DNS can determine surrogation is required for the DNS request based on the policy look up. The policy look up can determine a location of the user device associated with the DNS request, configuration policy, status of a plurality of surrogates including the surrogate DNS, and locality of the plurality of surrogates. The surrogate DNS can be configured to provide a request to an authoritative DNS server associated with a domain name of the DNS request. The result of the DNS resolution can be based on a location or source Internet Protocol address of the surrogate DNS instead of based on the DNS. The surrogate DNS can include the user device associated with the DNS request. A plurality of surrogates including the surrogate DNS can be geographically diverse and communicatively coupled to the DNS thereby forming a distributed security cloud network.

In yet another exemplary embodiment, a Dynamic Name Server (DNS) include a network interface; a processor communicatively coupled to the network interface; memory storing instructions that, when executed, cause the processor to: receive a DNS request from a user device through the network interface, wherein the user device is configured with an Internet Protocol address of the DNS for providing DNS resolution; perform a policy look up based on a plurality of factors related to the DNS request; and surrogate the DNS request to one of a plurality of surrogates based on the policy look up, wherein the one of the plurality of surrogates performs the DNS resolution instead of the DNS. The policy look up can determine a location of the user device, configuration policy, status of the plurality of surrogates, and locality of the plurality of surrogates such that the one of the plurality of surrogates is chosen based thereon. The one of the plurality of surrogates can include the user device associated with the DNS request. The plurality of surrogates can be geographically diverse and communicatively coupled to the DNS thereby forming a distributed security cloud network.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a network diagram of a distributed security system, and the like;

DETAILED DESCRIPTION OF THE DISCLOSURE

In various exemplary embodiments, the present disclosure relates to distributed cloud-based Dynamic Name Server (DNS) surrogation systems and methods. DNS surrogation is the idea that if a client sends a resolution request to a given DNS server, that server does not need to actually perform the recursion itself. A policy can be defined telling the server that first received the request to take other factors into account and "relay" or "surrogate" that request to another server. This additional server is called a "surrogate" and it will actually perform the recursion therefore allowing the resolving party to perform proper localization, optimization, or any other form of differentiated resolution. This surrogation also distributes the job of actually performing resolution, which adds scalability to the DNS server or service itself. A network of "surrogate" resolvers is possible as well as the concept of every client needing DNS resolution can also become a surrogate adding tremendous elasticity to the service.

The concept of surrogating DNS requests to a network of surrogates is unique and has not been accomplished before. A real need for DNS surrogation arises when building a cloud offering that is inherently reliant on DNS as a mechanism to provide service. Without surrogation, a DNS infrastructure must be built out in every region (city, country) that is serviced, which is a very costly endeavor. Surrogation allows for a DNS service to exist in a fewer number of sites while still providing results as if it in a greater number of sites while maintaining geographic localization. Surrogation also allows for a distributed method of providing DNS-based policy and resolution. If every client receiving service also is a surrogate then the network scales elastically with every client. Surrogation also allows for a client to "fail open". If the cloud service is unavailable to provide policy to the request the client can fail open and still be operable.

Figure 1:
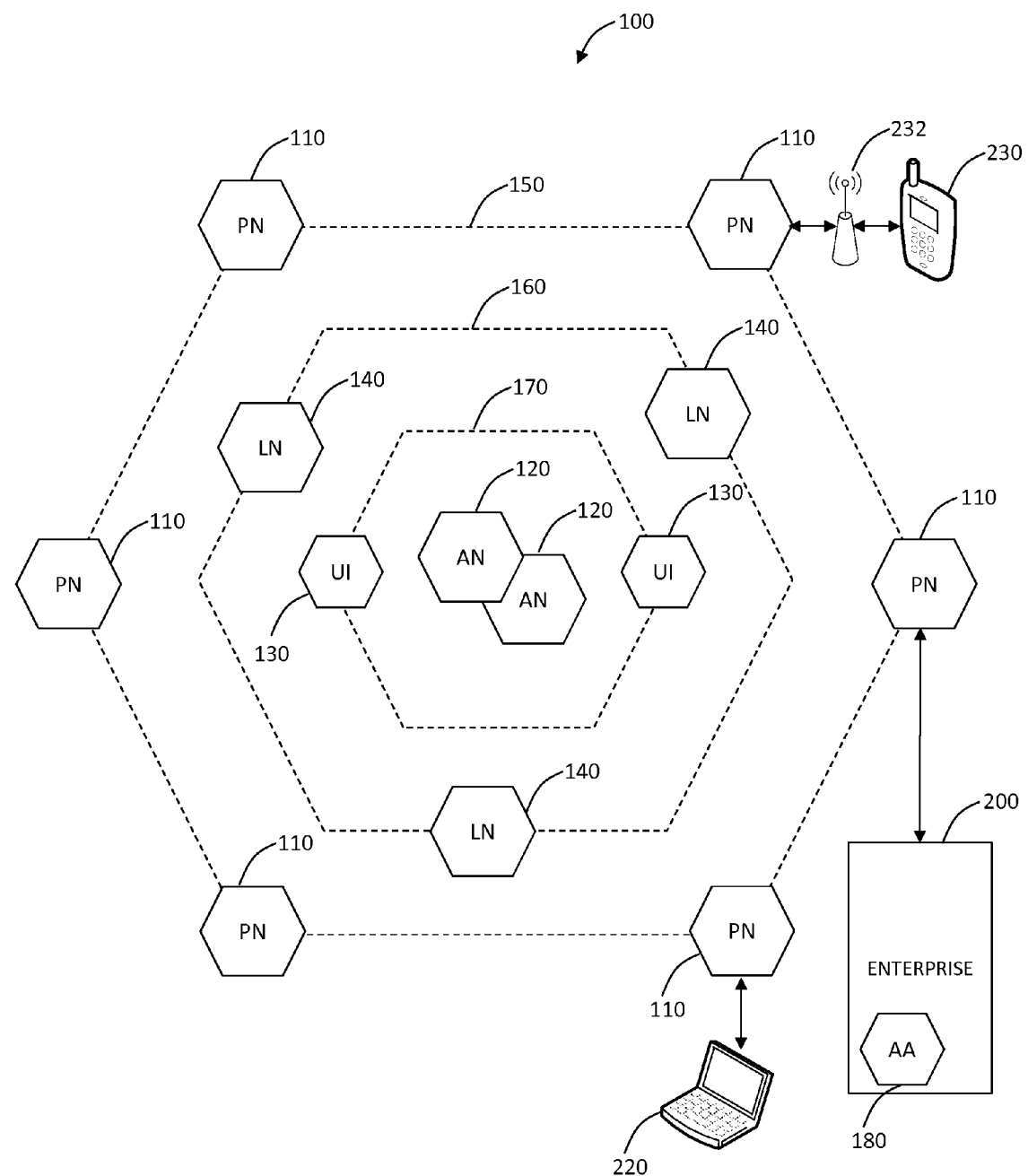

Referring to FIG. 1, in an exemplary embodiment, a block diagram illustrates a distributed security system 100. The system 100 may, for example, be implemented as an overlay network in a wide area network (WAN), such as the Internet, a local area network (LAN), or the like. The system 100 includes content processing nodes (PN) 110, that proactively detect and preclude the distribution of security threats, e.g., malware, spyware, viruses, email spam, etc., and other undesirable content sent from or requested by an external system. The processing nodes 110 can also log activity and enforce policies. Example external systems may include an enterprise 200, a computer device 220, and a mobile device 230, or other network and computing systems communicatively coupled to the system 100. In an exemplary embodiment, each of the processing nodes 110 may include a decision system, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an exemplary embodiment, the threat classification may be reduced to a subset of categories e.g., violating, non-violating, neutral, unknown. Based on the subset classification, the processing node 110 may allow distribution of the content item, preclude distribution of the content item, allow distribution of the content item after a cleaning process, or perform threat detection on the content item. In an exemplary embodiment, the actions taken by one of the processing nodes 110 may be determinative on the threat classification of the content item and on a security policy of the external system to which the content item is being sent from or from which the content item is being requested by. A content item is violating if, for any part $C=[c1, c2, \ldots, cm]$ of the content item, at any of the processing nodes 110, any one of the data inspection engines generates an output that results in a classification of "violating."

Figure 3:
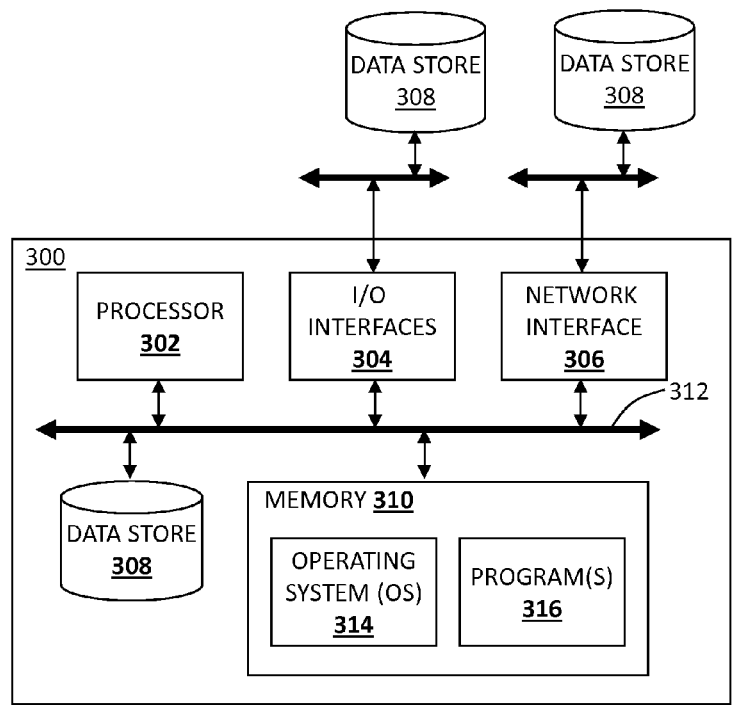
FIG. 3 is a block diagram of a server which may be used in the distributed security system of FIG. 1 or standalone.

Each of the processing nodes 110 may be implemented by one or more of computer and communication devices, e.g., server computers, gateways, switches, etc., such as the server 300 described in FIG. 3. In an exemplary embodiment, the processing nodes 110 may serve as an access layer 150. The access layer 150 may, for example, provide external system access to the security system 100. In an exemplary embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc. may be configured to establish communications through the nearest (in traffic communication time, for example) processing node 110. A mobile device 230 may be configured to communicated to a nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an exemplary embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, web sites and/or content that is disallowed, restricted domains, etc. The authority nodes 120 may distribute the policy data to the access nodes 110. In an exemplary embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may implemented by push and pull distribution schemes described in more detail below. In an exemplary embodiment, each of the authority nodes 120 may be implemented by one or more computer and communication devices, e.g., server computers, gateways, switches, etc., such as the server 300 described in FIG. 3. In some exemplary embodiments, the authority nodes 120 may serve as an application layer 160. The application layer 160 may, for example, manage and provide policy data, threat data, and data inspection engines and dictionaries for the processing nodes 110.

Other application layer functions may also be provided in the application layer 170, such as a user interface (UI) front-end 130. The user interface front-end 130 may provide a user interface through which users of the external systems may provide and define security policies, e.g., whether email traffic is to be monitored, whether certain web sites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 160. Each of the logging nodes 140 may store data related to security operations and network traffic processed by the processing nodes 110 for each external system. In an exemplary embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used.

In an exemplary embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an exemplary embodiment, the processing node 110 may act as a forward proxy that receives user requests to external servers addressed directly to the processing node 110. In another exemplary embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an exemplary embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols may be used. In another exemplary embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise the access agent 180 may be configured to perform MPLS labeling. In another transparent proxy mode exemplary embodiment, a protected system, such as the enterprise 200, may identify the processing node 110 as a next hop router for communication with the external servers.

Generally, the distributed security system 100 may generally refer to an exemplary cloud-based security system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one exemplary embodiment of a cloud-based system, and those of ordinary skill in the art will recognize the cloud based mobile device security and policy systems and methods contemplate operation on any cloud based system.

Figure 2:
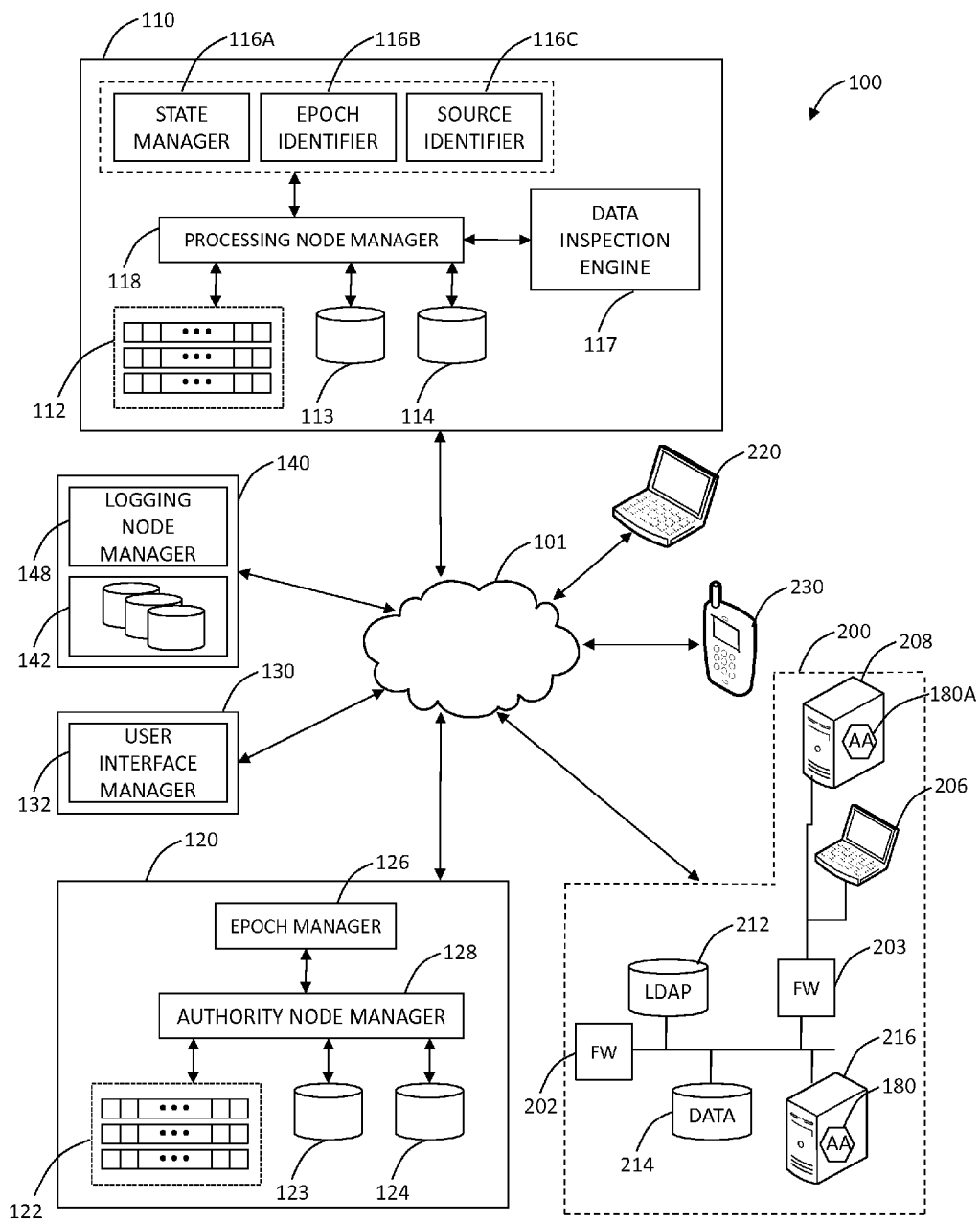
FIG. 2 is a network diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 therebetween. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight directory access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include a user identifiers, login passwords, and a login history associated with each user identifier. The other data stores 214 may include sensitive information, such as bank records, medical records, trade secret information, or any other information warranting protection by one or more security measures.

In an exemplary embodiment, a client access agent 180a may be included on a client computer 208. The client access agent 180a may, for example, facilitate security processing by providing a hash index of files on the user computer 208 to a processing node 110 for malware, virus detection, etc. Other security operations may also be facilitated by the access agent 180a. In another exemplary embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the server 206 of the enterprise 200, or to some other secured data provider server. The computer device 220 and the mobile device 230 can also store information warranting security measures, such as personal bank records, medical information, and login information, e.g., login information to a server 216 of the enterprise 200, or to some other secured data provider server.

In an exemplary embodiment, the processing nodes 110 are external to network edges of the external systems 200, 220 and 230. Each of the processing nodes 110 stores security policies 113 received from the authority node 120 and monitors content items requested by or sent from the external systems 200, 220 and 230. In an exemplary embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to further validate the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 may be distributed to the processing nodes 110, which then store a local copy of the detection processing filter 112.

In an exemplary embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an exemplary embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another exemplary embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 110.

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 112 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, may update the master threat data 124 and the master detection process filter 122 stored in the authority node data store according to the threat data update received from the processing node 110. In an exemplary embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated with the present invention. The data inspection engines 116, processing node manager 118, authority node manager 128, user interface manager 132, logging node manager 148, and authority agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

Referring to FIG. 3, in an exemplary embodiment, a block diagram illustrates a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or a similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Figure 4:
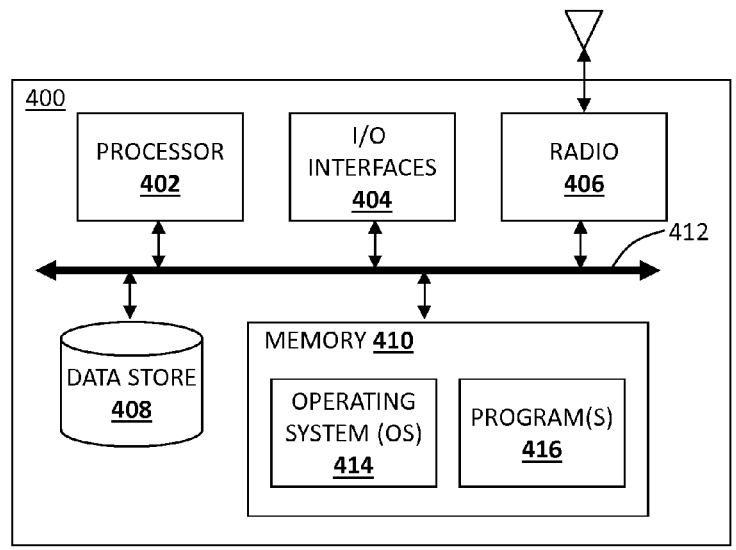
FIG. 4 is a block diagram of a mobile device which may be used in the system of FIG. 1 or with any other cloud-based system.

Referring to FIG. 4, in an exemplary embodiment, a block diagram illustrates a mobile device 400, which may be used in the system 100 or the like. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the mobile device 410 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 410, a semiconductor-based microprocessor (in the form of a microchip or chip set), or generally any device for executing software instructions. When the mobile device 410 is in operation, the processor 402 is configured to execute software stored within the memory 410, to communicate data to and from the memory 410, and to generally control operations of the mobile device 410 pursuant to the software instructions. In an exemplary embodiment, the processor 402 may include a mobile optimized processor such as optimized for power consumption and mobile applications. The I/O interfaces 404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 410. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs, and provides scheduling, input-output control, file and data management, memory management, and communication control and related services. The programs 416 may include various applications, add-ons, etc. configured to provide end user functionality with the mobile device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

Figure 5:
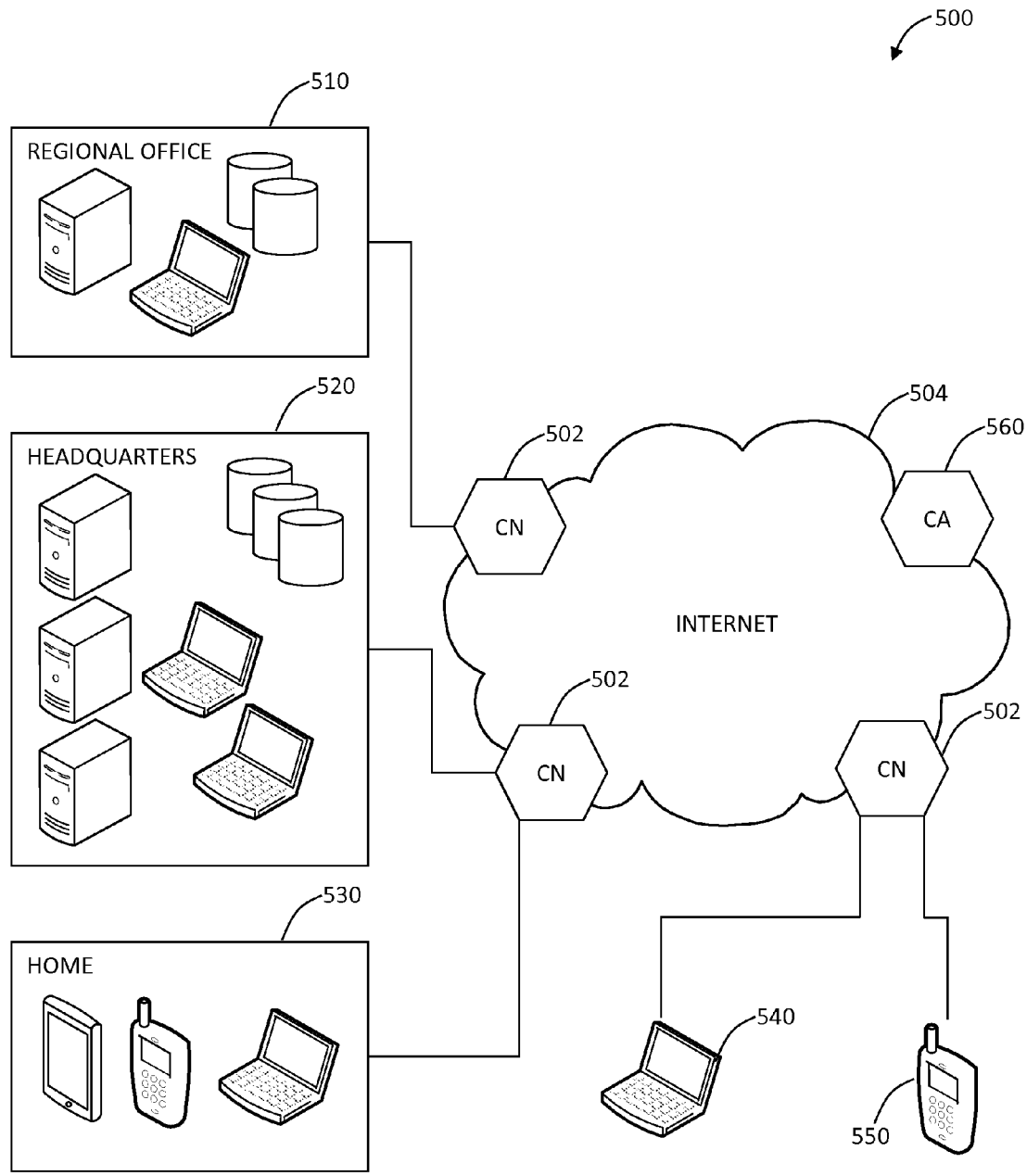
FIG. 5 is a network diagram of a cloud system.

Referring to FIG. 5, in an exemplary embodiment, a cloud system 500 is illustrated for implementing the DNS surrogation systems and methods systems and methods and the like. The cloud system 500 includes one or more cloud nodes (CN) 502 communicatively coupled to the Internet 504. The cloud nodes 502 may include the processing nodes 110, the server 300, or the like. That is, the cloud system 500 may include the distributed security system 100 or another implementation of a cloud based system. In the cloud system 500, traffic from various locations (and various devices located therein) such as a regional office 510, headquarters 520, various employee's homes 530, mobile laptop 540, and mobile device 550 is redirected to the cloud through the cloud nodes 502. That is, each of the locations 510, 520, 530, 540, 550 is communicatively coupled to the Internet 504 through the cloud nodes 502. The cloud system 500 may be configured to perform various functions such as spam filtering, uniform resource locator (URL) filtering, antivirus protection, bandwidth control, data loss prevention, zero day vulnerability protection, web 2.0 features, and the like. In an exemplary embodiment, the cloud system 500 and the distributed security system 100 may be viewed as Security-as-a-Service through the cloud.

In an exemplary embodiment, the cloud system 500 can be configured to provide mobile device security and policy systems and methods. The mobile device 550 may be the mobile device 400, and may include common devices such as smartphones, tablets, netbooks, personal digital assistants, MP3 players, cell phones, e-book readers, and the like.

The cloud system 500 is configured to provide security and policy enforcement for devices including the mobile devices 550 in the cloud. Advantageously, the cloud system 500 avoids platform specific security apps on the mobile devices 550, forwards web traffic through the cloud system 500, enables network administrators to define policies in the cloud, and enforces/cleans traffic in the cloud prior to delivery to the mobile devices 550. Further, through the cloud system 500, network administrators may define user centric policies tied to users, not devices, with the policies being applied regardless of the device used by the user. The cloud system 500 provides 24×7 security with no need for updates as the cloud system 500 is always up-to-date with current threats and without requiring device signature updates. Also, the cloud system 500 enables multiple enforcement points, centralized provisioning and logging, automatic traffic routing to a nearest cloud node 502, geographical distribution of the cloud nodes 502, policy shadowing of users which is dynamically available at the cloud nodes, etc.

In various exemplary embodiments, the cloud system 500 and/or the distributed security system 100 can be used to perform DNS surrogation. Specifically, DNS surrogation can be a framework for distributed or cloud-based security/monitoring as is described herein. Endpoint security is no longer effective as deployments move to the cloud with users accessing content from a plurality of devices in an anytime, anywhere connected manner. As such, cloud-based security is the most effective means to ensure network protection where different devices are used to access network resources. Traffic inspection in the distributed security system 100 and the cloud-based system 500 is performed in an in-line manner, i.e. the processing nodes 110 and the cloud nodes 500 are in the data path of connecting users. Another approach can include a passive approach to the data path. DNS is one of the most fundamental IP protocols. With DNS surrogation as a technique, it is proposed to use DNS for dynamic routing of traffic, per user authentication and policy enforcement, and the like.

In conjunction with the cloud system 500 and/or the distributed security system 100, various techniques can be used for monitoring which are described on a sliding scale between always inline to never inline. First, in an always inline manner, all user traffic is between inline proxies such as the processing nodes 110 or the cloud nodes 502 without exception. Here, DNS can be used as a forwarding mechanism to the inline proxies. Second, in a somewhat always inline manner, all user traffic except for certain business partners or third parties is between inline proxies such as the processing nodes 110 or the cloud nodes 502. Third, in an inline manner for most traffic, high bandwidth applications can be configured to bypass the inline proxies such as the processing nodes 110 or the cloud nodes 502. Exemplary high bandwidth applications can include content streaming such as video (e.g., Netflix, Hulu, YouTube, etc.) or audio (e.g., Pandora, etc.). Fourth, in a mixed manner, inline monitoring can be used for "interesting" traffic as determined by security policy with other traffic being direct. Fifth, in an almost never inline manner, simple domain-level URL filtering can be used to determine what is monitored inline. Finally, sixth, in a never inline manner, DNS augmented security can be used.

Figure 6:
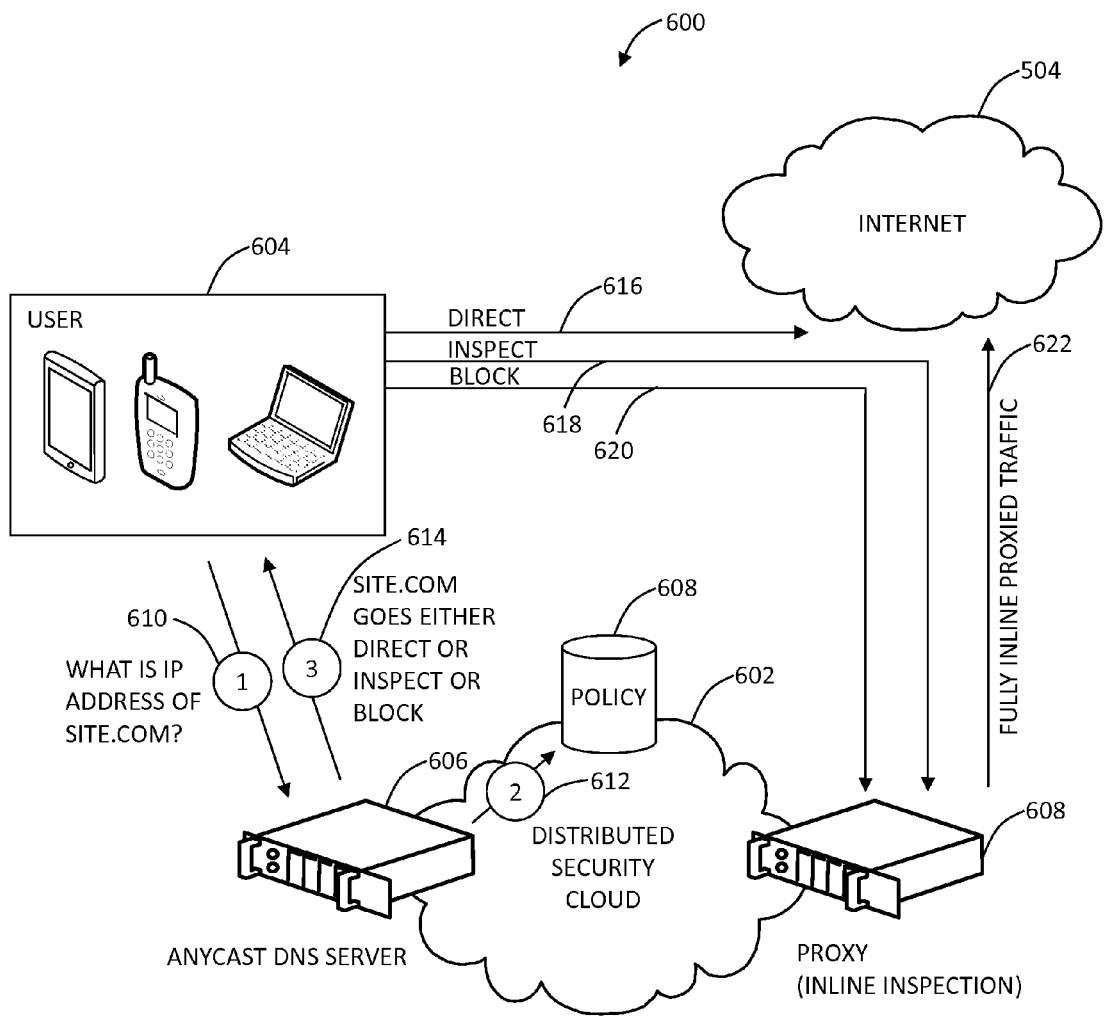
FIG. 6 is a network diagram of a network with a distributed security cloud providing DNS augmented security.

Referring to FIG. 6, in an exemplary embodiment, a network diagram illustrates a network 600 with a distributed security cloud 602 providing DNS augmented security. The network 600 includes a user device 604 connecting to the distributed security cloud 602 via an anycast DNS server 606. The anycast DNS server 606 can be a server such as the server 300 of FIG. 3. Also, the anycast DNS server 606 can be the processing node 110, the cloud node 502, etc. The distributed security cloud 602 includes the anycast DNS server 606, policy data 608, and an inline proxy 610. The inline proxy 610 can include the processing node 110, the cloud node 502, etc. In operation, the user device 604 is configured with a DNS entry of the anycast DNS server 606, and the anycast DNS server 606 can perform DNS surrogation as is described herein. The distributed security cloud 602 utilizes the anycast DNS server 606, the policy data 608, and the inline proxy 610 to perform the DNS augmented security.

The network 600 illustrates the DNS augmented security where DNS information is used as follows. First, at a step 610, the user device 604 requests a DNS lookup of a site, e.g. "what is the IP address of site.com?" from the anycast DNS server 606. The anycast DNS server 606 accesses the policy data 608 to determine the policy associated with the site at step 612. The anycast DNS server 606 returns the IP address of the site based on the appropriate policy at step 614. The policy data 608 determines if the site either goes direct (step 616) to the Internet, is inspected by the inline proxy (step 618), or is blocked per policy (step 620). Here, the anycast DNS server 606 returns the IP address with additional information if the site is inspected or blocked. For example, if the anycast DNS server 606 determines the access is direct, the anycast DNS server 606 simply returns the IP address of the site. If the anycast DNS server 606 determines the site is blocked or inspected, the anycast DNS server 606 returns the IP address to the inline proxy 610 with additional information. The inline proxy 610 can block the site or provide fully inline proxied traffic to the site (step 622) after performing monitoring for security.

The DNS augmented security advantageously is protocol and application agnostic providing visibility and control across virtually all Internet-bound traffic. For example, DNS-based protocols include Internet Relay Chat (IRC), Session Initiation Protocol (SIP), Hypertext Transfer Protocol (HTTP), HTTP Secure (HTTPS), Post Office Protocol v3 (POP3), Internet Message Access Protocol (IMAP), etc. Further, emerging threats are utilizing DNS today especially Botnets and advanced persistent threats (APTs). For example, Fast flux is a DNS technique used to hide phishing and malware delivery sites behind an ever-changing network of compromised hosts acting as proxies. The DNS augmented security provides deployment flexibility when full inline monitoring is not feasible. For example, this can be utilized in highly distributed with high bandwidth environments, in locations with challenging Internet Access, etc. The DNS augmented security can provide URL filtering, white/black list enforcement, etc. for enhanced security without content filtering. In this manner, the network 600 can be used with the distributed security system 100 and the cloud system 500 to provide cloud-based security without requiring full inline connectivity.

Figure 7:
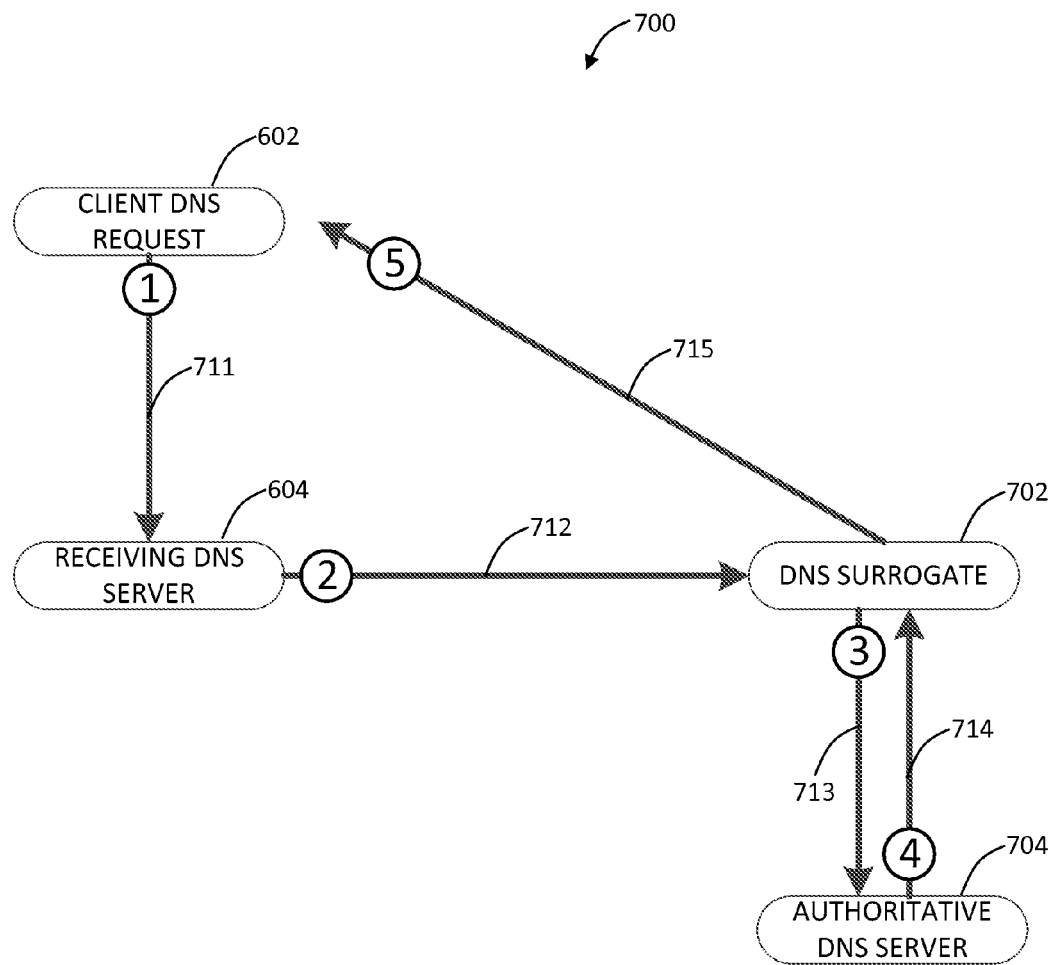
FIG. 7 is a flow diagram of a DNS surrogation method.

Referring to FIG. 7, in an exemplary embodiment, a flow diagram illustrates a DNS surrogation method 700. The DNS surrogation method 700 operates between a client device 602, a DNS server 604, a DNS surrogate server 702, and an authoritative DNS server 704. For example, the DNS surrogation method 700 can be implemented by the distributed security system 100, the cloud system 500, the network 600, or the like. The client device 602 can be any user equipment including, without limitation, the enterprise 200, the computer device 220, the mobile device 230, the mobile device 400, a smart phone, a cell phone, a tablet, a net book, an ultra-book, a laptop, a desktop, or any digital computing device networked to the DNS server 604. The DNS server 604, the DNS surrogate server 702, and the authoritative DNS server 704 can include the server 300 or the like. Prior to operation of the DNS surrogation method 700 (or any DNS requests), the client device 602 is configured to use the DNS server 604 under associated network settings. For example, the client device 602 is configured with the IP address of the DNS server 604 as its DNS server (e.g., 8.34.34.34 and 8.35.35.35). In this manner, the DNS server 604 is configured as the recursive DNS server for the client device 602.

The DNS surrogation method 700 includes the client device 602 requests resolution of a particular domain name using the associated configured recursive DNS server 604 (step 711). The receiving DNS server 602 performs a policy lookup based on several factors including the client location, configuration policy, the status of the available surrogates, the locality of those surrogates, etc. For example, the policy lookup can be through the policy data 608. If a decision to surrogate is made the request from the client device 602 is surrogated to a particular surrogate. For example, the receiving DNS server 604 provides the request from the client device 602 to the DNS surrogate server 702 (step 712). The DNS surrogate server 702 receives the request and performs recursion to get the requested resolution which includes sending a request to the authoritative DNS server 704 for the domain name which is being resolved (step 713). The authoritative DNS server 704 receives the request from the DNS surrogate server 702 allowing it to provide results based on the location/source IP address of the DNS surrogate server 702 as opposed to the receiving DNS server 604 (step 714). Finally, a localized/optimized/differentiated resolution (based on the DNS surrogate server 702) is provided directly back to the client device 602 (step 715). The DNS surrogation method 700 also allows for a lightweight DNS-based policy lookup occurring while leaving the actual process of resolution to take place on the DNS surrogate server 702. In this model the DNS surrogate server 702 can actually be the client device 602 itself that is receiving DNS-based policy and control. The client surrogate could be a mobile phone, laptop, virtual machine, appliance, etc.

Figure 8:
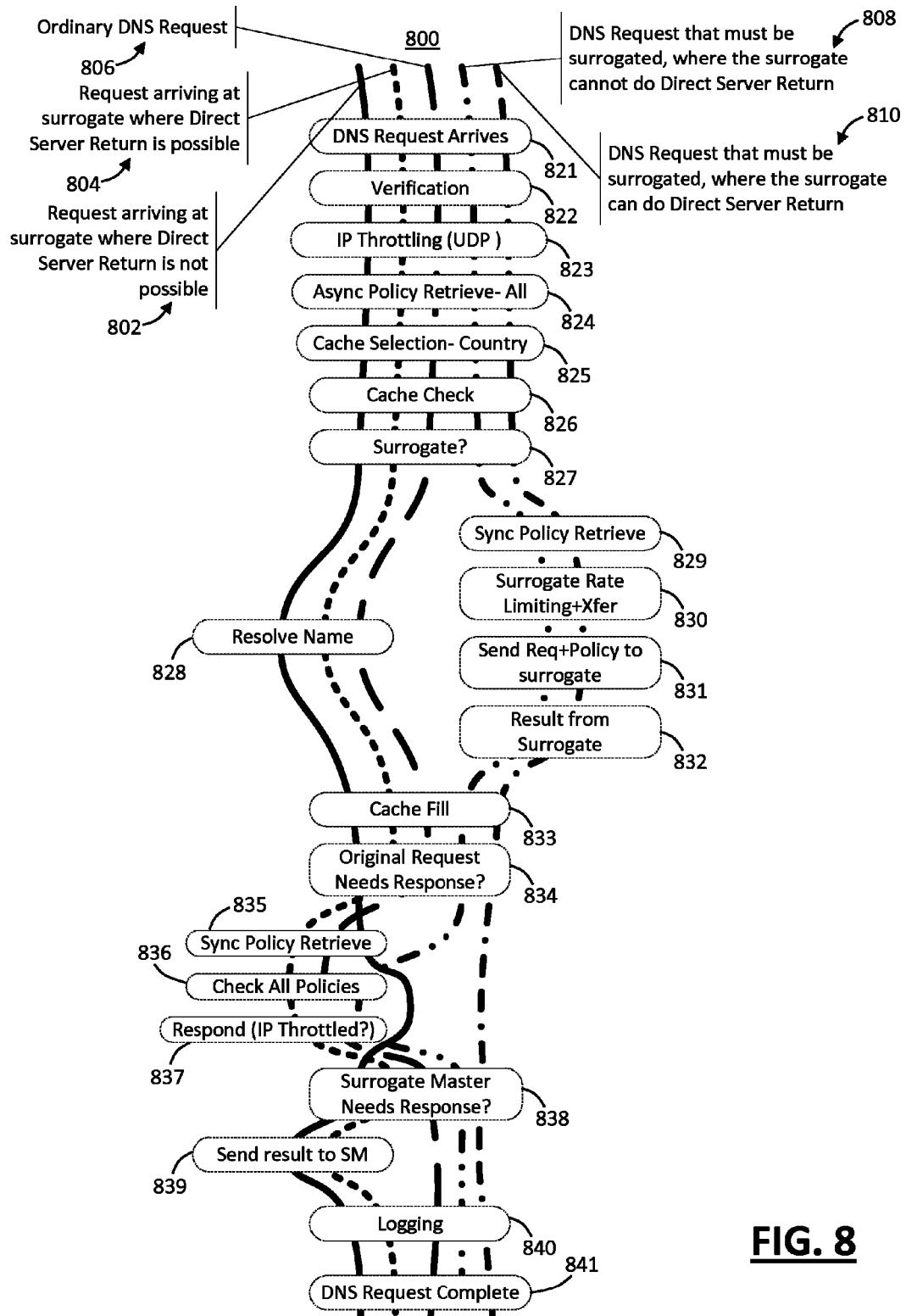
FIG. 8 is a flow diagram of a DNS surrogation method showing activity in the network of FIG. 6 and amongst the receiving DNS server and the DNS surrogate server of FIG. 7.

Referring to FIG. 8, in an exemplary embodiment, a flow diagram illustrates a DNS surrogation method 800 showing activity in the network 600 and amongst the receiving DNS server 604 and the DNS surrogate server 702. The DNS surrogation method 800 can be implemented with the DNS surrogation method 700. The DNS surrogation method 800 includes five types of DNS requests 802, 804, 806, 808, 810. First, a DNS request 802 can arrive at the DNS surrogate server 702 where a direct server return is not possible. Second, a DNS request 804 can arrive at the DNS surrogate server 702 where a direct server return is possible. Third, a DNS request 806 can be an ordinary DNS request. Fourth, a DNS request 808 can arrive that must be surrogated where the DNS surrogate server 702 cannot do a direct server return. Fifth, a DNS request 810 can arrive that must be surrogated where the DNS surrogate server 702 can do a direct server return.

The DNS surrogation method 800 includes the DNS request 802, 804, 806, 808, 810 arriving (step 821) and verification is performed (step 822). Optionally, the DNS surrogation method 800 can perform IP throttling such as with UDP (step 823). The DNS surrogation method 800 can asynchronously retrieve policy for the DNS request 802, 804, 806, 808, 810 (step 824). For example, the policy can be contained in the policy data 608 and can determine which type the DNS request 802, 804, 806, 808, 810. The DNS surrogation method 800 can select a cache based on geography (step 825) and check the selected cache (step 826). DNS cache servers store DNS query results for a period of time determined in the configuration (time-to-live) of the domain name record in question. All of the steps 821-827 can be performed for all of the different types of DNS request 802, 804, 806, 808, 810.

Next, the DNS surrogation method 800 determines if the type of DNS request 802, 804, 806, 808, 810 needs to be surrogated (step 827). The DNS requests 802, 804, 806 do not get surrogated, and the DNS requests 808, 810 do get surrogated. For the DNS requests 802, 804, 806, the DNS surrogation method 800 includes resolving the name of the DNS requests 802, 804, 806 (step 828). For the DNS requests 808, 810, the DNS surrogation method 800 performs a synchronous policy retrieval based on the DNS requests 808, 810 (step 829). Again, this can include the policy data 608. Here, the DNS surrogation method 800 can obtain information about which DNS surrogate server 702 to use, etc. With the policy retrieval, the DNS surrogation method 800 can perform rate limiting and transfer (step 830) and send the DNS request 808, 810 and the retrieved policy to the DNS surrogate server 702 (step 831). The DNS surrogation method 800 includes obtaining a result from the DNS surrogate server 702, the result being the DNS lookup of the DNS request 808, 810 (step 832).

Subsequent to steps 828, 832, the DNS surrogation method 800 can fill the cache (step 833). Next, the DNS surrogation method 800 determines if the DNS request 802, 804, 806, 808, 810 requires a response (step 834). The DNS requests 802, 804, 806, 808 require a response whereas the DNS request 810 does not. For the DNS requests 802, 804, 806, the DNS surrogation method 800 performs a synchronous policy retrieval (step 835). Subsequent to the step 835 and for the DNS requests 804, 806, 810, the DNS surrogation method 800 checks policies based on the policy retrieval (step 836) and responds based thereon (step 837). For example, a policy can include IP throttling. For all of the DNS request 802, 804, 806, 808, 810, the DNS surrogation method 800 determines if the DNS surrogate server 702 needs a response (step 838), and for the DNS requests 802, 804, the DNS surrogation method 800 sends the result to the DNS surrogate server 702. Finally, the DNS surrogation method 800 performs logging (step 840) and the DNS requests are complete (step 841).

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Dynamic Name System (DNS) surrogation method, comprising:
   receiving a DNS request at a DNS server;
   performing a policy look up based on a plurality of factors related to the DNS request;
   surrogating the DNS request to a surrogate DNS server of a plurality of surrogates based on the policy look up, wherein the DNS request is directed to the DNS server which performs the surrogating to the surrogate DNS to maintain geographic localization whiling minimizing deployment of DNS servers, and wherein the surrogate DNS server is separate and distinct from an authoritative DNS server;
   performing DNS resolution of the DNS request by the surrogate DNS server, wherein the DNS resolution comprises recursion by the surrogate DNS server;
   providing a result of the DNS resolution by the surrogate DNS server in response to the DNS request to the DNS server, wherein the providing is independent of the DNS server performing the receiving,
   wherein the plurality of surrogates are geographically diverse and communicatively coupled to a distributed cloud network, and wherein one or more of the plurality of surrogates comprise clients connected to the distributed cloud network.

2. The DNS surrogation method of claim 1, further comprising:
   configuring a user device to use the DNS server for DNS resolution; and
   performing the DNS resolution for the user device by the surrogate DNS server.

3. The DNS surrogation method of claim 1, further comprising:
   determining surrogation is required for the DNS request based on the policy look up.

4. The DNS surrogation method of claim 3, further comprising:
   performing the policy look up to determine a location of a user device associated with the DNS request, configuration policy, status of the plurality of surrogates, and locality of the plurality of surrogates.

5. The DNS surrogation method of claim 1, further comprising:
   providing a request from the surrogate DNS server to an authoritative DNS server associated with a domain name of the DNS request.

6. The DNS surrogation method of claim 5, further comprising:
   receiving the result of the DNS resolution based on a location or source Internet Protocol address of the surrogate DNS server instead of based on the DNS server.

7. The DNS surrogation method of claim 1, wherein the surrogate DNS server comprises a user device associated with the DNS request.

8. A Dynamic Name System (DNS) system, comprising:
   a DNS server implemented through a server comprising a processor, memory, and a network interface communicatively coupled to a user device;
   a policy data store communicatively coupled to the DNS server; and
   a surrogate DNS server of a plurality of surrogate DNS servers, the surrogate DNS server comprising a processor, memory, and a network interface communicatively coupled to the DNS server;
   wherein the DNS server is configured to:
   receive a DNS request from the user device;
   perform a policy look up based on a plurality of factors related to the DNS request; and
   transmit the DNS request to the surrogate DNS server based on the policy look up, wherein the DNS request is directed to the DNS server which determines the surrogate DNS to maintain geographic localization whiling minimizing deployment of DNS servers; and
   wherein the surrogate DNS server is configured to:
   perform DNS resolution of the DNS request, wherein the surrogate DNS is separate and distinct from an authoritative DNS server, wherein the DNS resolution comprises recursion by the surrogate DNS server; and
   provide a result of the DNS resolution to the user device in response to the DNS request received by the DNS server, wherein the result is provided independent of the DNS server which received the DNS request,
   wherein the plurality of surrogates are geographically diverse and communicatively coupled to a distributed cloud network, and wherein one or more of the plurality of surrogates comprise user devices connected to the distributed cloud network.

9. The DNS system of claim 8, wherein the user device is configured to use the DNS server for DNS resolution, and wherein the DNS resolution is performed by the surrogate DNS server in a distributed cloud-based security system.

10. The DNS system of claim 8, wherein the DNS server determines surrogation is required for the DNS request based on the policy look up.

11. The DNS system of claim 10, wherein the policy look up determines a location of the user device associated with the DNS request, configuration policy, status of a plurality of surrogates comprising the surrogate DNS server, and locality.

12. The DNS system of claim 8, wherein the surrogate DNS server is configured to provide a request to an authoritative DNS server associated with a domain name of the DNS request.

13. The DNS system of claim 12, wherein the result of the DNS resolution is based on a location or source Internet Protocol address of the surrogate DNS server instead of based on the DNS server.

14. The DNS system of claim 8, wherein the surrogate DNS server comprises the user device associated with the DNS request.

15. A Dynamic Name System (DNS) server, comprising:
- a network interface;
- a processor communicatively coupled to the network interface;
- memory storing instructions that, when executed, cause the processor to:
  - receive a DNS request from a user device through the network interface, wherein the user device is configured with an Internet Protocol address of the DNS server for providing DNS resolution such that the DNS request is directed to the DNS server;
  - perform a policy look up based on a plurality of factors related to the DNS request;
  - surrogate the DNS request to a surrogate DNS server of a plurality of surrogates based on the policy look up, wherein the surrogate DNS server performs the DNS resolution instead of the DNS server, wherein the DNS resolution comprises recursion by the surrogate DNS server, and wherein the surrogate DNS server is separate and distinct from an authoritative DNS server, and wherein the surrogate DNS server provides a response to the DNS request to the user device instead of the DNS server, wherein the response is provided independent of the DNS server which received the DNS request,
  - wherein the plurality of surrogates are geographically diverse and communicatively coupled to a distributed cloud network, and wherein one or more of the plurality of surrogates comprise user devices connected to the distributed cloud network.

16. The DNS server of claim 15, wherein the policy look up determines a location of the user device, configuration policy, status of the plurality of surrogates, and locality of the plurality of surrogates such that the surrogate DNS server is chosen based thereon.

17. The DNS server of claim 15, wherein the surrogate DNS server comprises the user device associated with the DNS request.

* * * * *